United States Patent
Bala et al.

(10) Patent No.: US 9,547,871 B2
(45) Date of Patent: Jan. 17, 2017

(54) SYSTEM AND METHOD FOR PURCHASING PHYSICAL TOYS AND CORRESPONDING VIRTUAL TOYS

(71) Applicant: Activision Publishing, Inc., Santa Monica, CA (US)

(72) Inventors: Karthik Bala, Santa Monica, CA (US); Jennifer Oneal, Santa Monica, CA (US); Ben Throop, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 282 days.

(21) Appl. No.: 13/841,964

(22) Filed: Mar. 15, 2013

(65) Prior Publication Data

US 2014/0274313 A1    Sep. 18, 2014

(51) Int. Cl.
*A63F 13/00* (2014.01)
*G06Q 30/06* (2012.01)
*A63F 13/825* (2014.01)

(52) U.S. Cl.
CPC ............ *G06Q 30/06* (2013.01); *A63F 13/825* (2014.09); *A63F 2300/65* (2013.01)

(58) Field of Classification Search
CPC ..... A63F 13/12; A63F 13/825; A63F 2300/65
USPC ...................... 463/1, 3, 42, 43, 47
See application file for complete search history.

(56) References Cited

U.S. PATENT DOCUMENTS

| | | | |
|---|---|---|---|
| 7,081,033 B1 * | 7/2006 | Mawle et al. | 446/175 |
| 8,636,588 B2 * | 1/2014 | Borge | 463/29 |
| 2002/0022507 A1 * | 2/2002 | Dan et al. | 463/1 |
| 2003/0060287 A1 * | 3/2003 | Nishiyama | 463/45 |
| 2004/0049606 A1 * | 3/2004 | Nakagawa | G06F 1/3203 710/1 |
| 2004/0128145 A1 * | 7/2004 | Sato | G06F 21/10 705/1.1 |
| 2005/0177428 A1 * | 8/2005 | Ganz | 705/14 |
| 2005/0250415 A1 * | 11/2005 | Barthold | 446/465 |
| 2006/0046808 A1 * | 3/2006 | Hiranoya et al. | 463/9 |
| 2006/0066046 A1 * | 3/2006 | Okada et al. | 273/144 R |
| 2006/0100018 A1 * | 5/2006 | Ganz | 463/42 |
| 2006/0116192 A1 * | 6/2006 | Okada | 463/20 |
| 2007/0015588 A1 * | 1/2007 | Matsumoto et al. | 463/43 |
| 2007/0211047 A1 * | 9/2007 | Doan et al. | 345/419 |

* cited by examiner

*Primary Examiner* — Jason Skaarup
*Assistant Examiner* — Ryan Hsu
(74) *Attorney, Agent, or Firm* — Klein, O'Neill & Singh, LLP

(57) ABSTRACT

System and methods for physical toy and virtual toy interactions are disclosed. According to aspects of the invention, a system for purchasing a physical toy and a corresponding virtual toy comprises a video game console, a physical toy, and a virtual toy corresponding to the physical toy. The virtual toy corresponding to the physical toy may be made available in a video game played on the video game console. The physical toy may be purchased by a user of the system from an external merchant. The virtual toy corresponding to the physical toy may be separately purchased by the user from a purchasing system within the video game. The physical toy may be registered with the gaming platform. If the user registers the physical toy with the gaming platform and the user previously purchased the virtual toy, the system refunds to the user the purchase price of virtual toy.

17 Claims, 11 Drawing Sheets

US 9,547,871 B2

SYSTEM AND METHOD FOR PURCHASING PHYSICAL TOYS AND CORRESPONDING VIRTUAL TOYS

BACKGROUND OF THE INVENTION

The present invention relates generally to video games and, more particularly, to a video game and a toy used in connection with the video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

One aspect of the invention provides a system for purchasing a physical toy and a corresponding virtual toy, the system comprising a video game console, an external merchant, a physical toy, and a virtual toy corresponding to the physical toy. The virtual toy corresponding to the physical toy may be made available in a video game played on the video game console. The physical toy may be purchased by a user of the system from the external merchant. The virtual toy corresponding to the physical toy may be separately purchased by the user from a purchasing system within the video game. The physical toy may be registered with the gaming platform. If the user registers the physical toy with the gaming platform and the user previously purchased the virtual toy, the system refunds to the user the purchase price of virtual toy.

Another aspect of the invention provides a system for purchasing a physical toy and a corresponding virtual toy, the system comprising a video game console, an external merchant, a physical toy, and a virtual toy corresponding to the physical toy. The virtual toy corresponding to the physical toy may be made available in a video game played on the video game console. Utilizing a purchasing system within the video game, the user of the system may transact a purchase of the physical toy from the external merchant. Upon purchase, the virtual toy corresponding to the purchased physical toy is made available for use within the video game.

Another aspect of the invention provides a video game system comprising a video game console, a peripheral for a gaming platform, a physical toy, a virtual toy corresponding to the physical toy, and a virtual toy box for collecting, displaying, and utilizing the virtual toy corresponding to the physical toy. Through the peripheral, the gaming platform is capable of identifying the physical toy and adding the corresponding virtual toy to the virtual toy box.

These and other aspects of the invention are more fully comprehended upon review of this disclosure.

DETAILED DESCRIPTION

Figure 1:
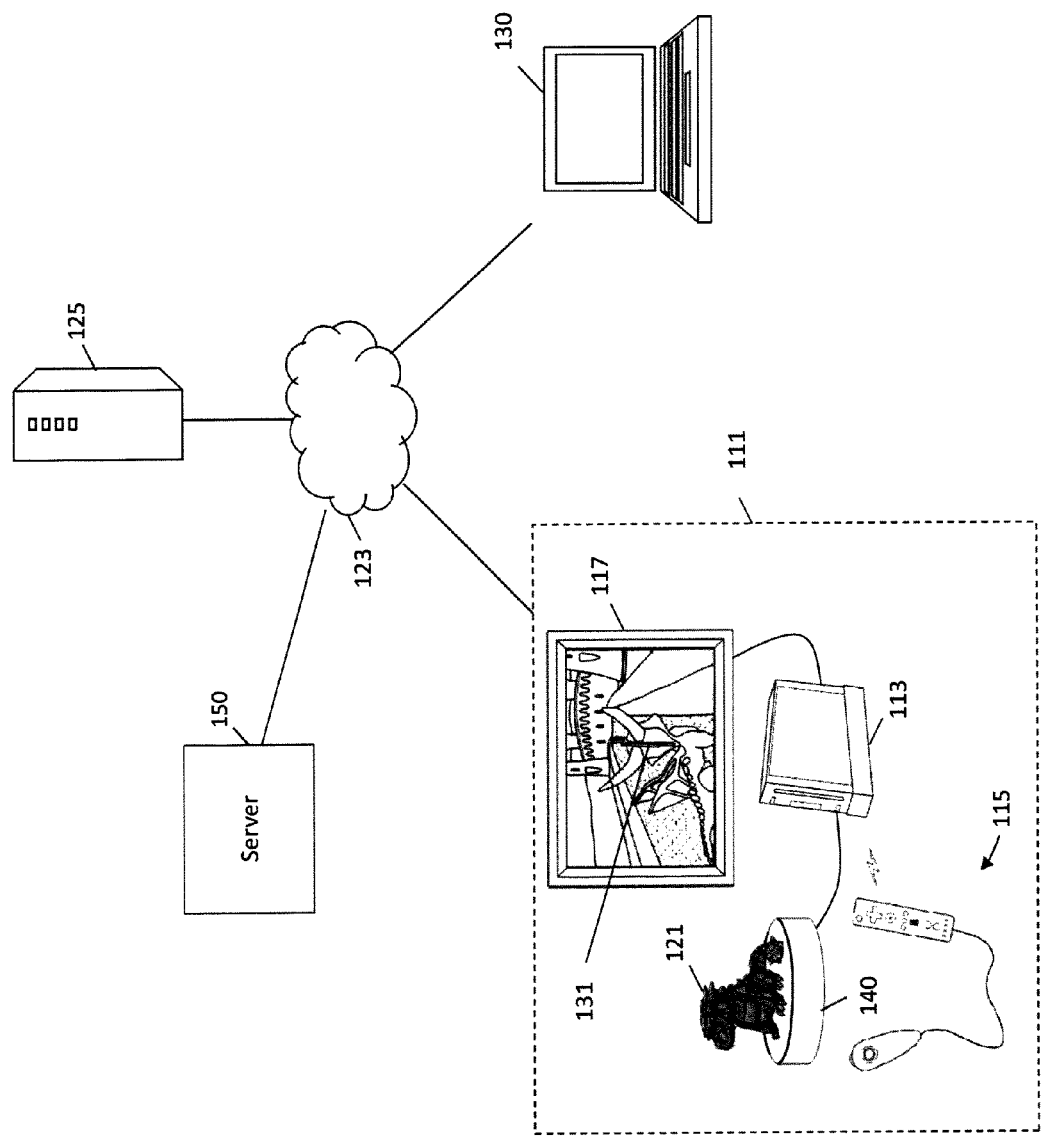
FIG. 1 is a block diagram illustrating an example of a system in accordance with aspects of the present invention.

FIG. 1 is a block diagram illustrating an example of a system in accordance with aspects of the present invention. Referring to FIG. 1, an embodiment of a system in accordance with aspects of the present invention includes gaming platform 111 for executing program instructions providing for game play and associated circuitry, I/O device 115 (such as a video game controller, keyboard, mouse, joystick, touch-screen display, voice input or other known devices), a display device 117, a physical toy 121, a virtual game character, which may be termed a virtual toy 131, corresponding to the physical toy, and a peripheral device 140. In some embodiments the gaming platform is coupled to network 123, and in some embodiments the system includes a server 150 coupled to the network 123. In some embodiments the system also includes a computer device, for example a server, of an external merchant 125 that may transmit data to and receive data from the gaming platform 111, and in some embodiments server 150, over network 123. In some embodiments, the system may also include a remote system 130, which may transmit data to and receive data from the external merchant 125 over network 123. In some embodiments, the server 150 stores user- and game-related information. In some embodiments, the server (which, as with the other servers discussed herein, may be multiple servers) provides for, possibly in conjunction with the gaming platform or the remote system, web-based game play featuring the virtual toy.

External merchant 125 may be any entity from which a user of the system may purchase game-related items, including for example, physical toys and/or virtual toys. In some embodiments, users, or possibly others acting on their behalf, for example parents of a user, may transact purchases with external merchant 125 through an online electronic commerce ("e-commerce") site over network 123. The users and others acting on their behalf may be considered purchasing entities, although for simplicity together they may simply be termed users herein. The e-commerce site may be hosted on the external merchant's own servers, or the e-commerce site may be hosted on a third-party's platform. For example, external merchant 125 may sell physical toys and/or virtual toys through online marketplaces such as www.amazon.com, or through known video game and toy retailers such as www.gamespot.com, or www.toysrus.com. Alternatively or in addition, users may transact purchases with external merchant 125 through traditional "brick and mortar" stores.

In some embodiments, in addition to a user being able to purchase toys using real currency (e.g. legal tender) or its equivalents, a user may purchase physical toys and/or virtual toys using virtual currency, or other types of in-game points or rewards. For example, a user may accumulate virtual currency by completing tasks and achievements during game play. The user may then use the accumulated virtual currency to purchase physical toys and/or virtual toys.

In some embodiments, the system includes one or more remote systems 130. Remote system 130 may be any computing device suitable for communicating with the external merchant 125 over network 123 and interacting with the external merchant's e-commerce site. For example, remote system 130 may be a computing device (e.g., desktop, personal computer, laptop, tablet, mobile device, personal media player, etc.) running an operating system (e.g., Windows, Linux, Unix, Mac OS, iOS, Android, Blackberry OS, etc.). A user of the system may use remote system 130 to access the e-commerce site of external merchant 125 to transact a purchase of game-related items, including for example physical toys and virtual toys.

Gaming platform 111 may be, in various embodiments, one, some, or any of a variety of processing devices capable of executing a video game program and communicating with a remote server, such as a traditional video game console (e.g., PlayStation, Xbox, Wii, WiiU), portable game console (e.g., Nintendo NDS, PlayStation Portable), a personal computer, a laptop, a mobile computing device (e.g., iPad or other tablet), or other mobile device (e.g., cell phone, smartphone, a device running iOS, Blackberry OS, or the Android Operating System). Gaming platform 111 provides video images to display device 117, part of or coupled respectively thereto. Gaming platform 111 may also provide audio outputs either to display device 117, an audio device of the gaming platform, or to a separate audio device not depicted in FIG. 1. Display device 117 is generally coupled to gaming platform 111 by a cable, although in some embodiments a wireless connection may be used. In many embodiments, the display device is a liquid crystal display. In some embodiments, the display device is a television. Display device 117 displays video images of game play, generally as commanded by the processor or other associated circuitry of gaming platform 111.

A user of the system may control gaming platform 111 and game play thereon via I/O device 115 coupled respectively thereto. In some embodiments game play is provided by the gaming platform, in some embodiments game play is provided by the gaming platform in conjunction with server 150.

In some embodiments, gaming platform 111 is able to communicate with and uniquely identify physical toy 121. The identification of physical toy 121 may be performed either through a direct coupling between toy 121 and gaming platform 111, either through a wired connection (e.g., USB, FireWire, Thunderbolt), through a wireless coupling (e.g., Bluetooth, WiFi, RFID, NFC) or other known object recognition methods, such as recognizing the physical toy 121 by capturing a visual image of the toy and determining identity, or by scanning a bar code or other code printed on the physical toy 121. In other embodiments, gaming platform 111 can communicate with and identify physical toy 121 via a peripheral device 140 coupled to gaming platform 111.

In some embodiments, gaming platform 111 can transmit data to and receive data from external merchant 125 over network 123. Gaming platform 111 communicates with external merchant 125 over network 123 using known communications and networking techniques, including known internet and cellular communication protocols. Gaming platform 111 allows users to interact with external merchant 125 through an interface displayed within the video game or displayed by the gaming platform 111. Through this interface, the user may transact purchases with external merchant 125.

Figure 2:
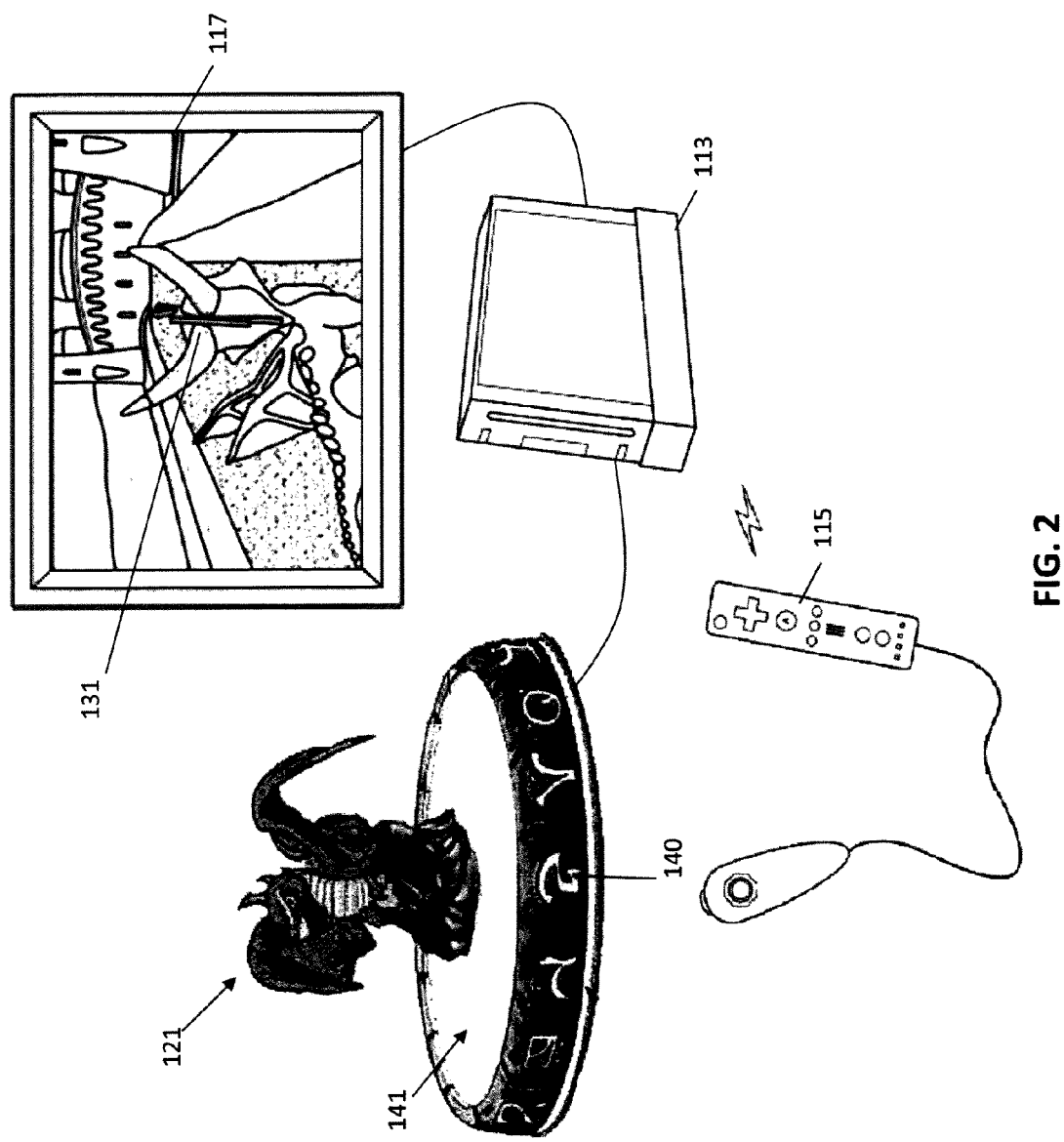
FIG. 2 illustrates an example of a video game system in accordance with aspects of the invention.

The peripheral device 140, in some embodiments, and as shown in FIG. 2, has a substantially flat upper surface 141 for placement of toys thereon. The user generally places game toys, for example, physical toy 121 in the form and representative of a dragon as shown in FIG. 2, on the flat surface 141 of peripheral device 140 during game play. Physical toy 121 is generally in the form of and representative of a game item such as a game character or other game item. In some embodiments, physical toy 121 corresponds to a virtual toy 131 used during game play.

Physical toy 121 may include machine-readable information, for example, memory, a radio frequency identification (RFID) tag, or a barcode. The machine-readable information may be sensed, read, and/or in some embodiments written, by peripheral device 140, in some embodiments indirectly by way of sending data and commands to physical toy 121 to write the data to memory of physical toy 121. The machine-readable information may include a numeric identifier. The machine-readable information allows peripheral device 140, or the processor of gaming platform 111, to distinguish physical toy 121 from other physical toys, and the machine-readable information may therefore be considered to include a toy identifier. In some embodiments, each physical toy has its own distinct identifier. In addition, in many embodiments the machine readable information includes additional information about a corresponding virtual toy that is depicted within game play, including in some embodiments, status of the virtual toy in a game. In still other embodiments, the physical toy 121 may include readable/writeable memo such as RAM for storing information related to the physical toy or the corresponding virtual toy.

When physical toy 121 is read by peripheral device 140, peripheral device 140 provides gaming platform 111 an indication of the identifier and status information of physical toy 121, and generally the processor of gaming platform 111 commands display of a corresponding virtual toy that is depicted within game play or otherwise made available in game play. Likewise, when a physical toy in the form of an article such as a hat or weapon is placed on the peripheral device, the processor may make a virtual toy corresponding to the article appear in the game and the virtual toy may affect changes or the ability to make changes in the game. For example, when a hat toy and a character toy are concurrently on the peripheral device, the corresponding character in the game may possess the corresponding hat. Thus, video game play may be affected by use of physical toys, which may be utilized either for video game play and/or observation separate from video game play.

In some embodiments, once gaming platform 111 recognizes and identifies physical toy 121, a corresponding virtual toy 131 is presented in a game operating on gaming platform 111 and displayed on display 117. The user may control virtual toy 131 within the game via I/O device 115. Virtual toy 131 may have one or more characteristics and/or attributes associated with it, such as health, strength, power, speed, wealth, shield, weapons, or achievement level, for example. A physical toy that has never been used within the gaming environment may have initial attributes and/or characteristics that are preprogrammed in the gaming software or gaming platform. As the user plays the game utilizing, at least in part, virtual toy 131, the one or more characteristics and/or attributes associated with physical toy 121 may be altered.

For example, as a user progresses through different challenges within the game using virtual toy 131, the user may discover and collect various virtual items usable by virtual toy 131 that alter the characteristics and/or attributes of virtual toy 131. For example, the user may obtain, using virtual toy 131, a new sword that may alter the weapons associated with virtual toy 131, or virtual gold that may alter the wealth associated with virtual toy 131. As another example, the user may obtain, via using virtual toy 131, a virtual potion to increase the strength of virtual toy 131. As another example, the reward for completing certain challenges within the game may be to increase the health, wealth, strength, speed, agility or other characteristics or attributes of virtual toy 131, and the penalty for failing to complete those tasks may be a decrease in one or more of those characteristics or attributes. These one or more characteristics or attributes may be altered in innumerable ways via game play, and these examples are only illustrative.

In some embodiments, at the completion of a particular gaming session, or periodically throughout a gaming session, the changes in attributes to the virtual representation of physical toy 121 may be stored by gaming platform 111 to the server 150. This attribute and/or characteristic data is stored on said server 150, for example via a relational database, and is associated with the particular physical toy 121 for subsequent access by the user utilizing physical toy 121 in subsequent gaming sessions either on the same or different gaming platforms. Accordingly, the updated data pertaining to the one or more characteristics and/or attributes associated with the virtual representation of physical toy 121 may persist across platforms. These attributes may also be stored elsewhere, such as a memory associated with platform 111 or a memory associated with physical toy 121.

In a subsequent gaming session on either the same gaming platform or a different gaming platform, the particular gaming platform is able to access the updated data pertaining to the one or more characteristics and/or attributes for use in the subsequent gaming session. The server 150 is able to utilize the identification of physical toy 121, described above, and retrieve the up to date data associated with the virtual representation of that toy physical 121 when prompted by a gaming platform in response to an identification of physical toy 121. The server 150 may then transmit that data to the gaming platform for use in that game session.

The transmission of data pertaining to physical toy 121 from server 150 may happen at a number of stages in various embodiments. For example, the data transmission may begin immediately upon identification of physical toy 121 prior to the beginning of game play. In another embodiment, game play may be allowed to commence prior to complete or partial retrieval of data pertaining to physical toy 121 so as to allow game access more quickly. In still other embodiments, the data may only be retrieved in response to a user request.

Once retrieved from server 150, the gaming console may continue to communicate with server 150 or may, in alternative embodiments, store the data in a local memory associated with the platform or physical toy 121. In such embodiments, the data may be updated to server 150 periodically, at the end of a gaming session, in response to a user request, or at any other interval or game play event.

In some embodiments, however, game play may be conducted without the peripheral device providing the gaming platform an indication of an identifier and status information of a physical toy. In some embodiments, which may be in conjunction with embodiments having a physical toy, a user, for example by way of the gaming platform or remote system 130, may purchase or otherwise obtain the ability to use a virtual toy without a corresponding physical toy. In some such embodiments the server 150 may provide the gaming platform the indication of the identifier and/or status information of the virtual toy, for example for use in play of the video game.

In certain embodiments, the user may establish an account where the account information is also stored on the server 150 and/or on one or more gaming platforms. The user may access the account by entry of a username and password, for example. The server 150 may subsequently create a linkage or association between the account and physical toy 121 reflecting that physical toy 121 has been used in connection with that account. The user account may have multiple toys or objects associated and/or linked to it. Such a system may be advantageous for various reasons. In one embodiment, a user may log into the user's account on a gaming platform. Data for the various toys and objects associated and/or linked to that user account may be retrieved from server 150 in response to the user logging into the account or in response to the user having a first physical toy 121 identified by a gaming platform, which may reduce possible delay resulting from data being retrieved from the server when a new toy is desired for game play.

In still other embodiments, a single physical toy 121 may have various virtual characteristics stored on server 150 for different user accounts. For example physical toy 121 may be associated with the accounts of User A and User B. User A may have played in the various gaming environments using physical toy 121 more than User B. When User A logs into his or her account and uses physical toy 121 in connection with a gaming platform, the data associated with the characteristics of the representation of physical toy 121 resulting from User A's progression in the various gaming environments using physical toy 121 will be reflected, for example. User B may also use physical toy 121 in connection with his or her account, but have data specific to User B's account with respect to physical toy 121 reflecting the characteristics of the representation of physical toy 121 resulting from User B's progression in the various gaming environments using physical toy 121 or other objects associated with User B's account.

For example, a user may have a physical toy 121 such as a dragon depicted in FIG. 2. In a first gaming session, a user may place the physical toy 121 on a peripheral connected to the user's gaming console 113. The game console identifies the physical toy 121 as a particular toy dragon or as a dragon that has been linked to a user account. The user plays the game using, in part, a virtual representation of the physical toy 121 dragon. In the course of that game play, the user accomplishes various tasks earning virtual toy 131 dragon increases in strength and speed. Data reflecting those increases are transmitted to and stored in a memory associated with server 150. In a subsequent gaming session, for example on the user's same console, the user places the physical toy 121 dragon on the peripheral associated with that gaming device 113. The gaming device is able to identify the physical toy 121 dragon and retrieve the up to date data regarding the increases in strength and speed accomplished in the prior gaming session for use in the subsequent gaming session. During the course of the second gaming session, the user accomplishes various tasks earning virtual toy 131 dragon still further increases in other attributes, for example, defense and agility. Data reflecting those increases are transmitted to and stored in a memory associated with server 150 so that a complete set of up to date data reflecting the virtual toy 131 is stored. In still another subsequent gaming session, for example, on the user's mobile device, the mobile device recognizes and identifies the physical toy 121 dragon and connects to server 150 to retrieve the up to date data reflecting the strength, speed, defense and agility associated with physical toy 121 dragon for use in that game session. The same sequence can be performed in various gaming sessions across any compatible gaming device, thereby preserving the user's progress associated with physical toy 121 across each session regardless of the gaming platform.

In alternative embodiments, the physical toy 121 may have an identification code associated with it. User may access for game play the data reflecting the one or more characteristics and/or attributes stored on server 150 associated with physical toy 121 by entering the identification code, rather than utilizing the physical toy 121 itself. In further alternative embodiments, the user may be able to link physical toy 121 to a user account, such that the user may access the data for game play the data reflecting the one or more characteristics and/or attributes stored on server 150 associated with physical toy 121 by entering the user's account credentials.

Referring to FIG. 2, the peripheral device 140 may also provide the capability to read and write information to physical toy 121 in alternative embodiments. The processor in gaming console 113, responsive to inputs from user input device 115 and peripheral device 140, generally commands display on display device 117 of game characters in and interacting with a virtual world of game play and possibly each other. In addition, the processor, responsive to inputs from peripheral device 140, may be used to add virtual toys to the virtual world, with the virtual toys being available in game play. For example, the processor may present virtual toys in the form of characters in game play based on inputs from peripheral device 140, and the processor may control actions and activities of the virtual toys based on inputs from user input device 115.

The instructions providing for game play are generally stored on removable media, for example, an optical disk. Accordingly, the game console may include an optical drive, for example, a DVD-ROM drive, for reading the instructions for game play. In some embodiments, the game console may be a personal computer, including similar internal circuitry as herein described, as well as, for example, a built-in display and built-in user input devices, such as a keyboard and a touch pad. In other embodiments, the instructions providing for game play may be stored in a remote server that is accessed by a computer or mobile device. In yet other embodiments, the instructions providing for game play may be stored locally on the gaming device memory.

In the embodiment of FIG. 2, the display screen 117 shows a screen shot of video game play. As illustrated, the screen shot shows a display of a virtual toy 131 that is in the form of a dragon, and that is generally controlled by and animated in accordance with user inputs. The virtual toy 131 is approaching an inanimate item in the form of what may be considered a castle.

Figure 3:
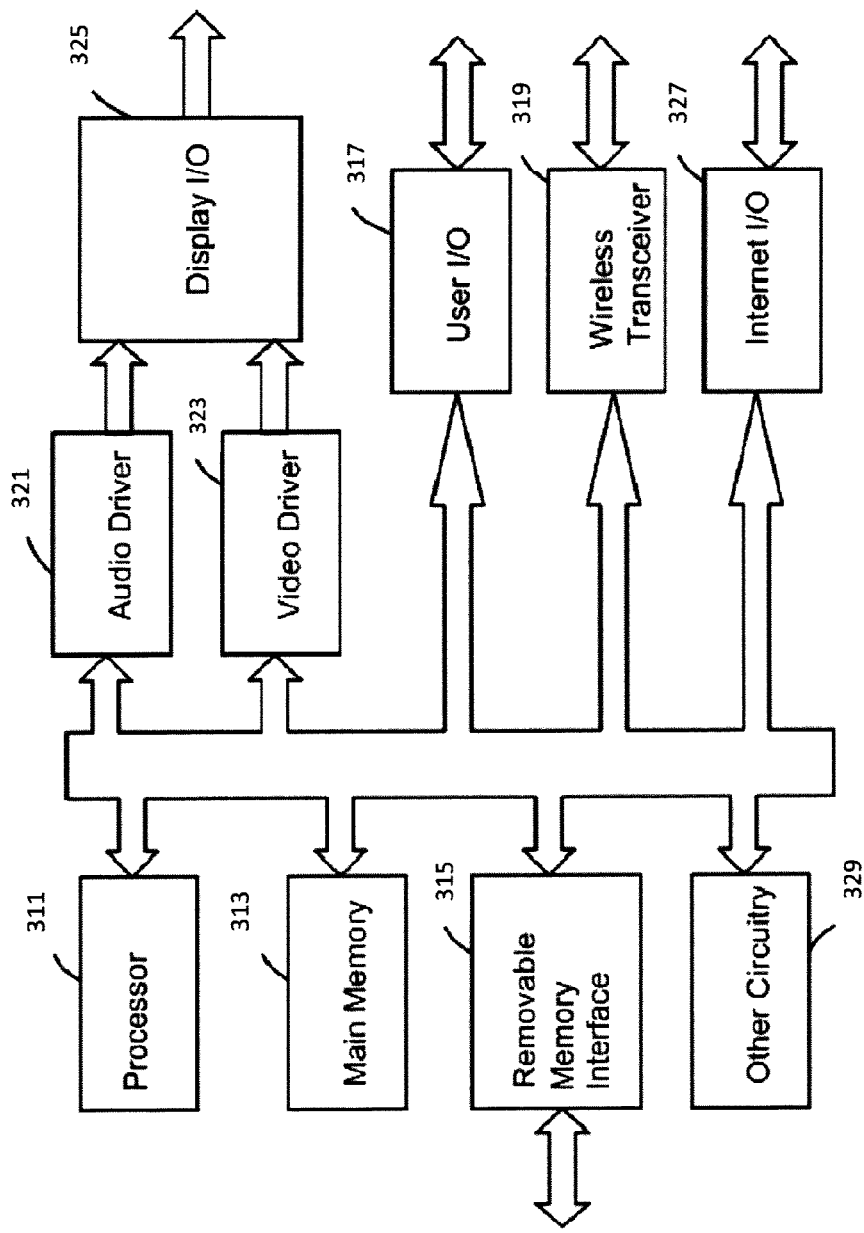
FIG. 3 is a block diagram illustrating an example of a gaming platform in accordance with aspects of the present invention.

FIG. 3 is an example of a block diagram of a processor and associated circuitry, for example, for a game console, useful in accordance with aspects of the invention. As shown in FIG. 3 a processor 311 is connected to other components via a bus. The other components include a main memory 313 and a removable memory interface 315 generally coupled to a removable memory device, for example, a DVD-ROM drive. The processor may execute instructions retrieved from the removable memory device to control game play and store game state information in the main memory. For example, the instructions may be for determining possible movements, positions, and locations of a game character.

The processor is coupled to an audio driver 321 and a video driver 323. The audio driver produces sound signals and the video driver produces image signals. The sound signals and image signals are transmitted from the game console via a display I/O device 325. The display I/O device generally supplies the sound and image signals to a display device external to the game console. Sound signals may also be supplied to a peripheral device such as a toy reader.

The processor may also be coupled to a user I/O device 317, a wireless transceiver 319, an Internet I/O device 327, and other circuitry 329. The user I/O device may receive signals from a peripheral device and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 4:
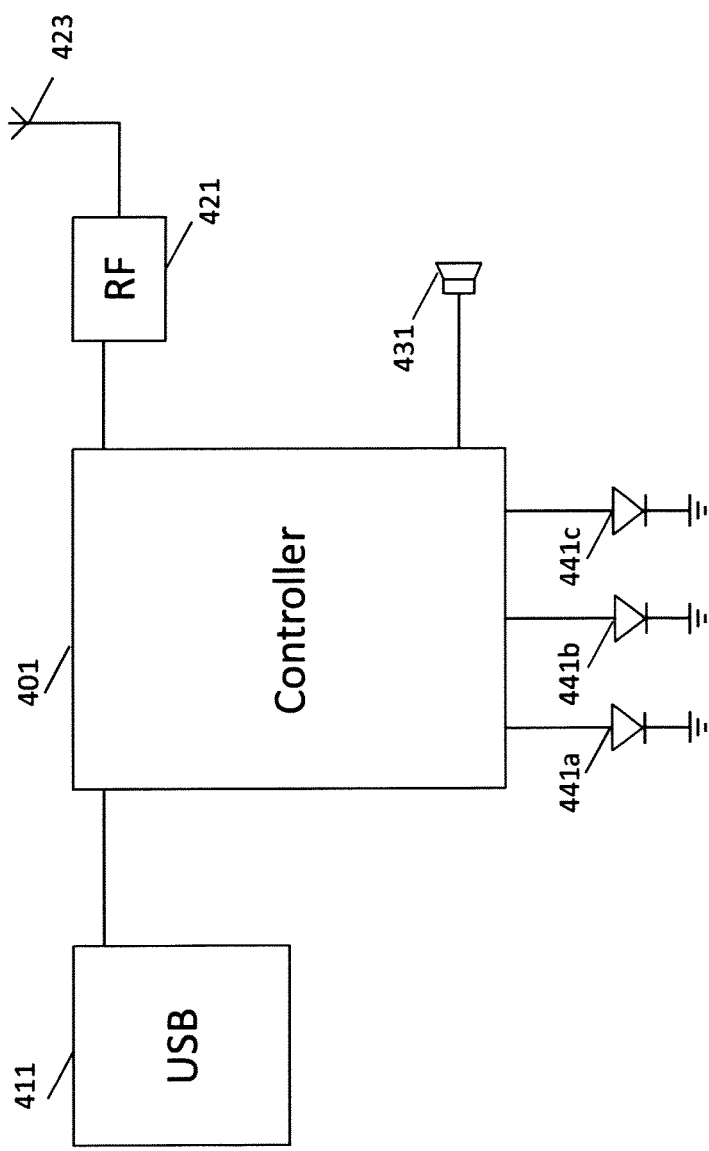
FIG. 4 is a block diagram of a video game peripheral in accordance with aspects of the invention.

FIG. 4 is a block diagram of a video game peripheral in accordance with aspects of the invention. The peripheral may be used in some embodiments as the peripheral device 140 of FIG. 1 and FIG. 2. The peripheral may be used to provide information from the physical toy to a gaming platform and, in some embodiments, from the gaming platform to the physical toy. Accordingly, the peripheral includes a universal serial bus (USB) interface 411 to communicate with the gaming platform. In some embodiments, the peripheral may use a different interface, for example, a wireless interface for communication with the gaming platform. The information communicated between the peripheral and the gaming platform may be encrypted, and the information read from or written to the physical toy by the peripheral may also be encrypted.

The peripheral also includes a radio-frequency interface 421 to communicate with physical toys. In many embodiments, the radio-frequency interface is an RFID interface. In other embodiments, the peripheral may include a different interface for communicating with physical toys, such as an optical interface or a wired interface. It is further understood that in some embodiments, the peripheral device (as depicted in FIG. 4) may be removed. For example, in certain embodiments of the present invention, the functionality of the peripheral device may already be included, in whole, or part, within the gaming platform, such as for example, NFC or RFID equipped mobile device.

In one embodiment of an optical interface the physical toy includes a light source, for example an LED, to provide information of the machine readable information and a photodiode to receive information of commands, with circuitry operable within the physical toy to provide for associated operation of the LED and photodiode in performing communication functions. Power may be provided to the physical toy by way of a battery, by way of RFID operations, or by other sources. In such an embodiment the peripheral device similarly includes a photodiode and LED for communication with the physical toy.

In another embodiment the peripheral device includes an imaging device, for example a CCD and associated circuitry. In such embodiments the imaging device may generate an image, for analysis by the peripheral device or in most embodiments by the gaming platform, with the image providing information related to the physical toy. In some embodiments identity of the toy may be determined by shape or other features, such as color or reflectivity, of the physical toy or portions of the physical toy. Similarly, identity and other information of the physical toy may be provided by image information placed on the physical toy, including, for example, information of stickers placed on the bottom of the physical toy, placed either prior to receipt of the physical toy by a user or by the user, in which case the information may be changed by the user in accordance with game play results. The physical toy may instead, or in addition, include bar code or bar code like information, with the peripheral device including bar code scanning components.

Further in some embodiments the physical toy may include a wired connection to the peripheral device, or in some embodiments, a wired connection to the gaming platform, possibly dispensing with the peripheral device. Similarly, in some embodiments the physical toy may include wireless communication capabilities of the type commonly used with computers, for example Bluetooth, NFC, or Wi-Fi capabilities.

The peripheral may include a controller 401 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what physical toys are present on the peripheral or to read from or write to a particular physical toy. In other embodiments, the controller may independently communicate with the radio-frequency interface and supply resulting information to a gaming platform over the USB interface. For example, the controller may, via the radio-frequency interface, regularly detect what physical toys are newly present on the peripheral and report the detected physical toys to the gaming platform via the USB interface. The controller generally includes a programmable device such as a microprocessor performing program instructions. The program instructions may be stored in the peripheral as firmware or downloaded from the gaming platform.

The peripheral also includes, in some embodiments, a loudspeaker 431. The loudspeaker provides audio signaling to game players and the signaling may relate to a particular toy present on the peripheral. In some embodiments, the peripheral includes visual indicators such as light-emitting diodes 441*a*-*c*. The diodes may, for example, be illuminated with intensities or colors that signal performance in the video game of characters associated with physical toys on the peripheral. Both the loudspeaker and visual indicators are coupled to the controller. The controller signals the loudspeaker and visual indicators to operate according to commands received via the USB interface.

Figure 5:
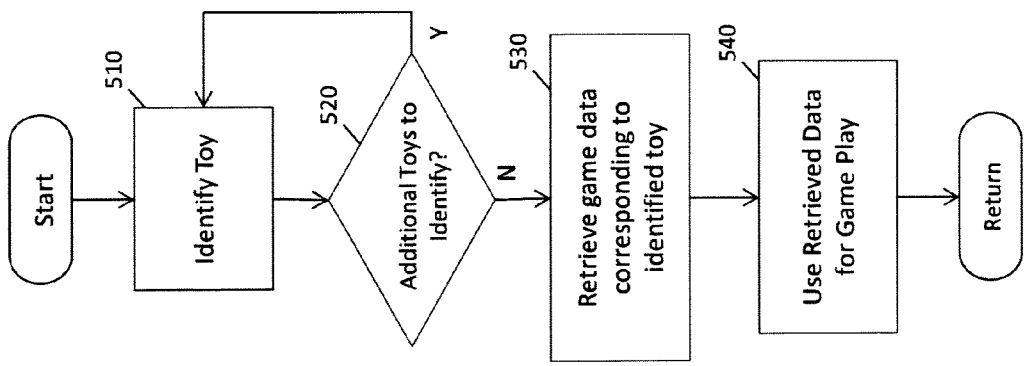
FIG. 5 is a flowchart of a process for identification of a toy and retrieval of data associated with toy in accordance with aspects of the invention.

FIG. 5 is a flowchart of a process for identification of a physical toy 121 and retrieval of data associated with physical toy 121 in accordance with aspects of the invention. The process may be implemented by a video game peripheral, a video gaming platform, or a combination of devices. Additionally, the process may be implemented using a processor configured by program instructions. The process may be performed utilizing a standardized protocol, for example, the ISO/IEC 14443 standard for Identification Cards. Accordingly, the process may communicate with physical toys via radio-frequency communication.

In block 510, the process identifies physical toys in a defined region. For example, the process may determine what physical toy 121 is on the surface of a video game peripheral as shown in FIG. 2. In various embodiments, the physical toy 121 may be identified by RFID, barcodes, or optical recognition. In one embodiment, identification of physical toys includes a video game peripheral reading identifiers of the physical toys and supplying the identifiers to a video gaming platform.

In block 520, the process determines if any additional physical toys must be identified. If so, further identification is conducted in accordance with block 510. If no further physical toys require identification, the process proceeds to block 530.

In block 530, data corresponding to the identified toy is retrieved, for example, via a connection to a remote server or from memory on the gaming device, peripheral, or the physical toy itself. In block 540, the retrieved data for the one or more identified physical toys is used, at least in part, in conducting the game play on the gaming device.

Figure 6:
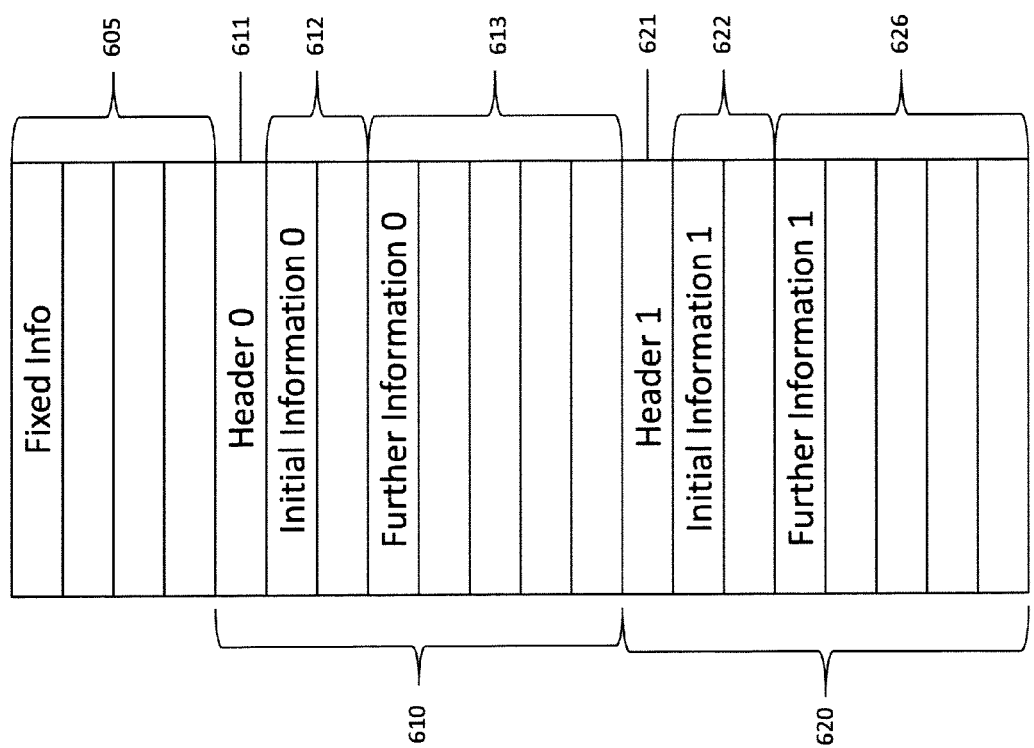
FIG. 6 is a diagram of data structure in accordance with aspects of the invention.

FIG. 6 is a diagram of data structure in accordance with aspects of the invention. The structure may be used to store data in a server or in alternative embodiments in a memory on the gaming device, in a memory on a peripheral to the gaming device or in a memory of a toy, or any combination thereof. Information about the toy, such as its characteristics and its status, are stored at various locations in the data structure. Although various fields of the data structure are shown in particular locations in FIG. 6, the data structure may use a different arrangement of the fields.

The data structure includes an area of fixed information 605. The fixed information includes information that identifies a type of toy and a particular instance of the toy, for example, the fixed information may include a 32-bit serial number. The fixed information may also include an identification of objects related to the toy, such as an identification of a trading card. The fixed information generally includes a field for data verification, for example, a cyclic-redundancy check value or checksum. The fixed information is generally written when the toy is created and not thereafter changed.

The data structure also includes a first data area 610 and a second data area 620. Each of the data areas contains corresponding fields for certain values representing status information about a game play character associated with the toy. However, the first data area and the second data area contain values that reflect the toy's status at different times. For example, the first data area may contain current values and second data area may contain previous values. How which of the data areas is current may be determined and controlled is described further below.

The first data area 610 includes a first header 611. The first header includes information about the toy that may change frequently during game play, such as fields that store score values, experience levels, or money values. The first header may also include a field indicating how much cumulative time the toy has been used for game play. The first header also contains a sequence field that may be used to determine whether the first data area contains current data.

The first data area 610 includes a first initial information area 612. The first initial information area includes information about the toy for use in adding the character associated with the toy to game play. For example, the first initial information area may include a field that stores a name for the toy. The first initial information area may include additional fields that store information useful for displaying a representation of the character associated with the toy in the game. For example, there may be information indicating upgrades that have been acquired for the character associated with toy or objects the character may be wearing, such as hats. In some embodiments, however, the fixed information may contain sufficient information for adding the character associated with to the toy to game play, with the fixed information used instead of the initial information.

The first data area 610 includes a first further information area 613. The first further information area includes fields that indicate additional information about the character's status beyond the information contained in the first header and the first initial information area. The fields in the first further information area may include, for example, a value indicating when the character associated with the toy most recently joined the game, a value indicating when the toy was first used in the game, an indication of a player to which the toy belongs, and an indication of what challenges or skill tests the character associated with the toy has completed in the game.

The first data area generally includes one or more fields for data verification, for example, checksums. In one embodiment, the first header includes three checksums: a checksum for the entire first data area, a checksum for the initial information area, and a checksum for the header itself. The inclusion of three checksums may allow the corresponding areas to be verified or updated without reading or writing other areas.

The second data area 620 includes a second header 621, a second initial information area 622, and a second further information area 623. Each of the areas in the second data area corresponds to a like named area in the first data area. Two data areas may be advantageous to provide cycling areas on consecutive saves and also may add redundancy for the case of partial updates and write failures. In some embodiments, the data structure includes additional data areas, for example, a third data area and a fourth data area.

Figure 7:
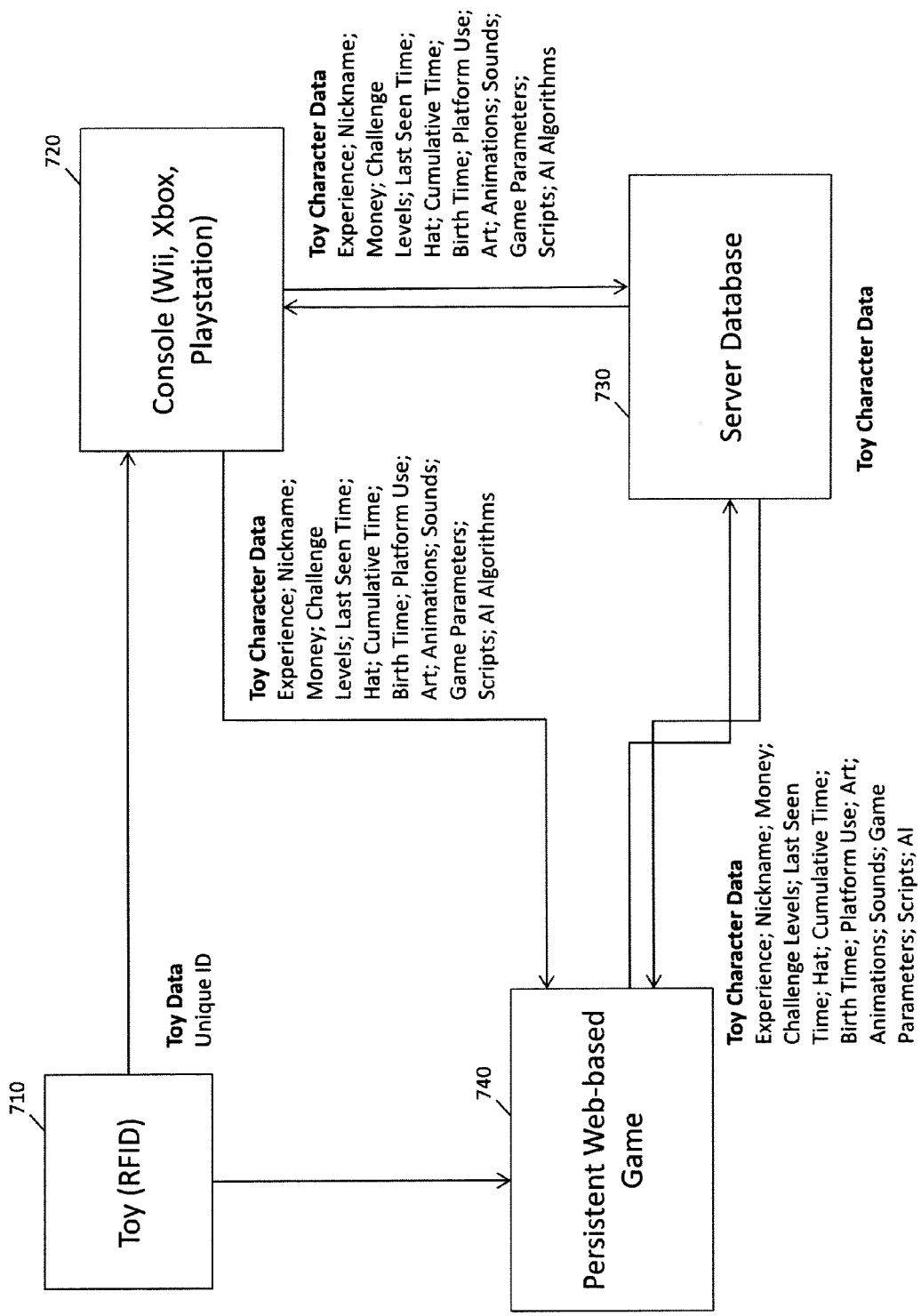
FIG. 7 is a diagram of an embodiment of data flow between various gaming platforms utilizing aspects of the invention disclosed herein.

FIG. 7 is a diagram of an embodiment of data flow between various gaming platforms utilizing aspects of the invention disclosed herein. In the embodiment illustrated in FIG. 7, toy 710 includes an RFID tag to provide unique identification of the toy 710 as described elsewhere in the specification. It is understood that in various embodiments other identification techniques may also be used consistent with the descriptions herein. Gaming platforms 720 (e.g. Wii, Xbox, Playstation, PC, mobile device) can receive the RFID tag, or other identification information, for example via a peripheral as described above or through other techniques described herein. During game play on gaming platforms 720, information related to the toy 710 (referred to in FIG. 7 as "Toy character data") is updated. The updated toy character data is sent to and stored on a server database 730. In subsequent gaming sessions, the up to date toy character data can be transmitted from server database 730 to any gaming console 720 in communication with server database 730 for use in gaming sessions. The toy character data may comprise one or more of the following: experience, nickname, money, challenge levels, last seen time, hat, cumulative time, birth time and platform use, art, animations, sounds, game parameters, scripts and AI algorithms.

In some embodiments, a web-based game 740 may also be provided for use in connection with toy 710. The web-based game 740 may receive toy character data directly from a console 720, or may also receive toy character data from the server database 730. The toy character data may be transmitted between these various systems via known networks, such as interne networks, cellular data networks or LANs. In some embodiments a server, for example server 150 of the system of FIG. 1, may provide for game play in conjunction with a gaming platform, with for example the server determining game states for game play and providing game state information to the gaming console.

In still other embodiments, not depicted in FIG. 7, some or all of the character data may also be stored on toy 710 or on a memory associated with console 720. This may be advantageous so that users may have access to certain character data in the absence of a server connection.

A video game system may provide for video game play in which a virtual game character moves in and potentially interacts with others in a virtual world. Some such video games may be configured for use with physical toys as well, which may enhance game play experience, with the physical toys corresponding to the virtual game characters, which may be called virtual toys. The physical toys may include memory for storing status information regarding the virtual game character, for example health of the virtual game character and so on, and during game play the memory may be referenced to determine capabilities of the virtual toy. A physical toy may be obtained, for example by way of purchase, after play has already been conducted using the corresponding virtual toy.

Figure 8:
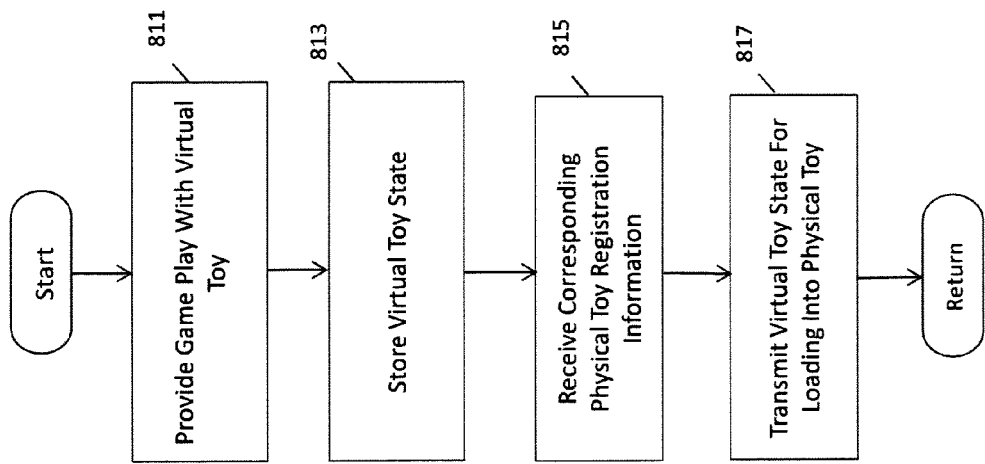
FIG. 8 is a flowchart of a process for transferring status of a virtual toy to a subsequently purchased physical toy in accordance with aspects of the invention.

FIG. 8, therefore, is a flow diagram of a process that provides for transfer of video game play status of a virtual toy into a memory of a corresponding subsequently obtained physical toy, in accordance with aspects of the invention. The process of FIG. 8 may be performed, for example, by the system of FIG. 1 or portions thereof.

In block 811, the process provides for game play with a virtual toy. In some embodiments, the process provides for game play with the virtual toy by transmitting information regarding the virtual toy to a gaming platform configured to provide video game play including the virtual toy. The information may be transmitted by a server, for example. The information may be, for example, characteristics of the virtual toy. In some embodiments, the information regarding the virtual toy is merely information to allow for unlocking of virtual toy information already on the gaming platform, but unavailable for use during game play absent unlocking information.

In block 813, the process stores virtual toy status information. In some embodiments, status information of the virtual toy may change during game play. For example, as a result of game play the virtual toy may advance in levels, have health values increased or decreased, gain or lose special powers or abilities, etc. In some embodiments, updated status information of the virtual toy is provided from a gaming platform to the server, variously as updated, periodically, or upon conclusion of a game play session, for example.

In block 815, the process receives registration information of a subsequently purchased corresponding physical toy. The physical toy corresponds to the virtual toy, and/or vice versa. In some embodiments, the registration information includes a unique identifier of the physical toy. In some embodiments, the registration information includes an indication of a user with whom the physical toy is to be associated.

In block 817, the process transmits the updated status of the virtual toy, for example to a game console, for the purpose of updating character status information in memory of the physical toy. In many embodiments, the updated status of the virtual toy is only transmitted after the process determines that the user, or more generally a purchasing entity associated with the user, has already purchased use of the virtual toy. In some embodiments this determination may be made, albeit inexactly, by determining if the corresponding virtual toy associated with the user has updated status information.

The process thereafter returns.

Figure 9:
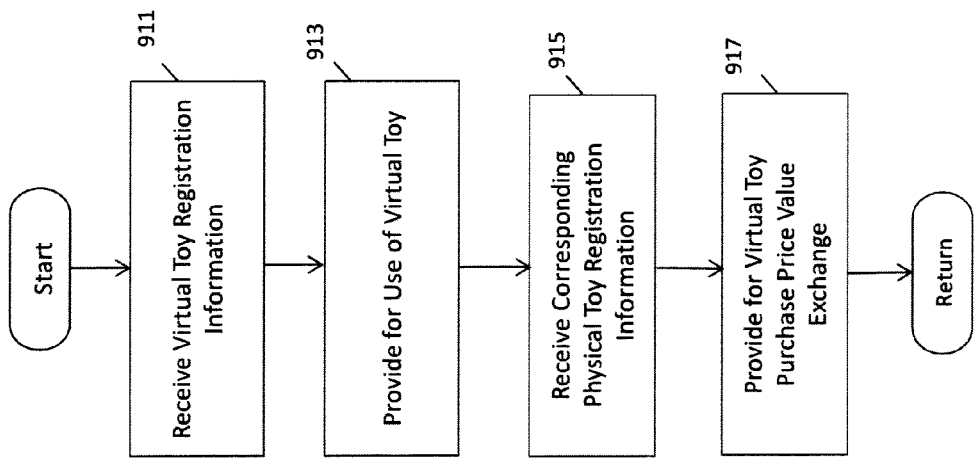
FIG. 9 is a flowchart of a process for providing value to a purchaser of a physical toy who previously purchased a virtual toy in accordance with aspects of the invention.

FIG. 9 is a flow diagram of a process, in accordance with aspects of the invention, for providing for return of value for prior payment when a physical toy is purchased after purchase of a corresponding virtual toy for use. The process may be performed, for example, by the system of FIG. 1 or portions thereof.

In block 911, the process receives virtual toy registration information. In many embodiments, the virtual toy registration information is received by a server, and is received in conjunction with a purchase of use of the virtual toy in video game play. The virtual toy registration information may include an identification of the virtual toy and an identification of a user with whom the virtual toy is to be associated. In some embodiments, the identification of the virtual toy identifies a particular video game character generically, for example by name, and in some embodiments, identifies both the video game character generically and uniquely, for example as being a video game character of a certain name and being the first such video game character of that name associated with that user. In some embodiments, the virtual toy registration information may also include information for provision of refunds, etc., to a purchasing entity who purchased use of the virtual toy.

In block 913, the process provides for use of the virtual toy. In some embodiments, this may be, for example, by way of by transmitting information regarding the virtual toy to a gaming platform configured to provide video game play including the virtual toy. In some embodiments, this may be, for example, by way of providing or allowing for provision of presentation information featuring the virtual toy, or viewing of attributes of the virtual toy, or otherwise allowing for control of the virtual toy in limited circumstances outside of normal game play. For example, in some embodiments the virtual toy may be made available in the context of a virtual toy chest, in which the virtual toy may be viewed and possibly responsive to at least some user inputs to a game platform, but outside the normal virtual world of game play.

In block 915, subsequent to operations of block 911, the process receives registration information for a physical toy corresponding to the virtual toy. In some embodiments, the registration information includes a unique identifier of the physical toy. In some embodiments the registration information includes an indication of a user with whom the physical toy is to be associated.

In block 917, the process provides for return of value to the purchasing entity that purchased use of the virtual toy. The return of value may be in the form of a rebate of the purchase price of the virtual toy, a refund or partial refund of the purchase price of the virtual toy, provision of in-game credits to the user, or other value to the purchasing entity.

The process thereafter returns.

Figure 10:
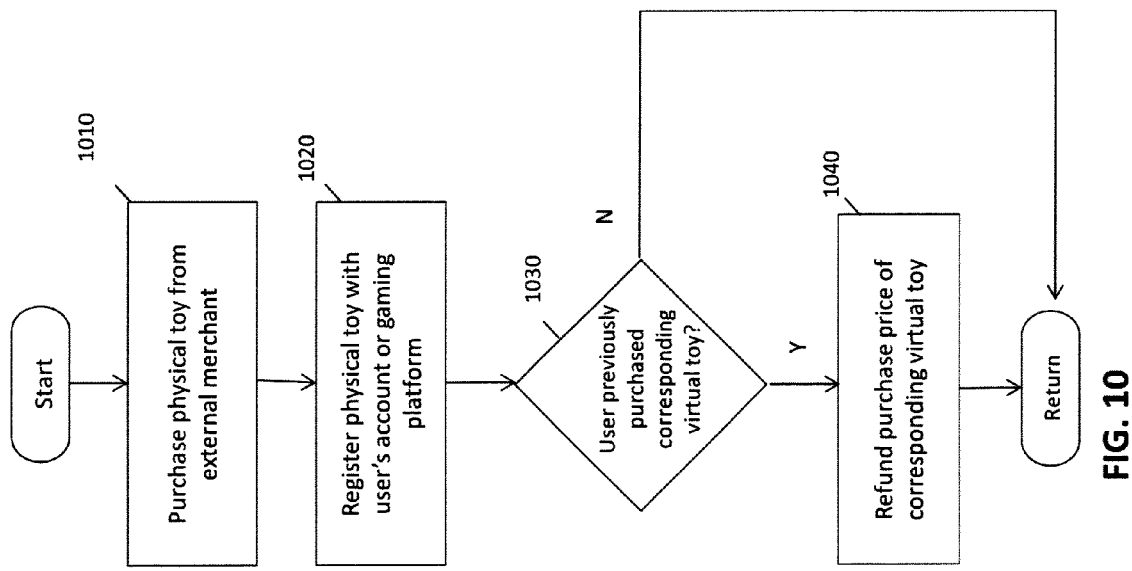
FIG. 10 is a flowchart of a process for refunding the purchase price of a virtual toy in accordance with aspects of the invention

In accordance with aspects of the present invention, FIG. 10 is a flowchart of a process for refunding the purchase price of a virtual toy 131 upon registering a physical toy 121 with the user's account or gaming platform. The process may be implemented by an external merchant, remote system, video game peripheral, a video gaming platform, or a combination of devices. Additionally, the process may be implemented using a processor configured by program instructions.

In block 1010, the process transacts a purchase of a physical toy 121 through an external merchant 123. As discussed, the external merchant 123 may conduct purchase transactions through any suitable store, including for example, a traditional brick and mortar store, an e-commerce site external to the gaming platform, an e-commerce site internal to the gaming platform, or a combination of the aforementioned.

In block 1020, the process registers physical toy 121 with a user's account relating to the gaming platform or with the gaming platform itself. In some embodiments, a user registers the physical toy 121 with the user's account by inputting identification data associated with the purchased physical toy 121 into the user's account information. For example, the user may login to the system storing the user's account information either through gaming platform 111 or remote system 130. Upon accessing the user's account, the user may be presented with an interface for registering physical toys. The user may then enter a code or identification data associated with the purchased physical toy 121 into the system. The user's account data is updated to reflect that the user has purchased and registered physical toy 121. It should be appreciated the physical toy 121 may be registered independently of whether the user has received the physical toy 121. For example, if the user purchased the physical toy 121 from the external merchant's e-commerce site, there may be a shipping delay associated with the transaction. The user may, however, be given the identification information for the purchased physical toy 121 before actually receiving the physical toy 121 in the mail. In this way, the user may register the physical toy 121 immediately or shortly after purchasing physical toy 121 and begin enjoying the benefits of registering physical toy 121, as further discussed below.

In other embodiments, physical toy 121 is automatically registered by gaming platform 111. For example, if the user purchases physical toy 121 from an e-commerce site within the gaming platform, the gaming platform may automatically register physical toy 121 with the user's account.

In other embodiments, physical toy 121 is registered when identification data stored in the physical toy 121 is retrieved by the gaming platform 111. For example, when the purchased physical toy 121 is placed on peripheral 140 and identification data stored on the physical toy 121 is retrieved by gaming platform 111, gaming platform 111 may update the user's account information or other information stored in gaming platform 111 to reflect that the user has registered physical toy 121.

In block 1030, the process determines whether the user previously purchased a virtual toy 131 corresponding to the purchased physical toy 121. The process does this, for example, by comparing the identification data of the physical toy 121 with identification data of virtual toys previously purchased by the user. If the user did not previously purchase a virtual toy 131 corresponding to the purchased physical toy 121, the process returns. If the user previously purchased a virtual toy 131 corresponding to the purchased physical toy 121, the process proceeds to block 1040.

In block 1040, the process returns the purchase price of the virtual toy 131 corresponding to the purchased physical toy 121. In some embodiments, the purchase price is credited to the user's account associated with the gaming platform. In other embodiments, the purchase price may be credited to an external account of the user (e.g., an external bank account or Paypal account linked to the user's gaming platform account). In other embodiments, the purchase price may be sent as a check to the user via traditional mail.

Figure 11:
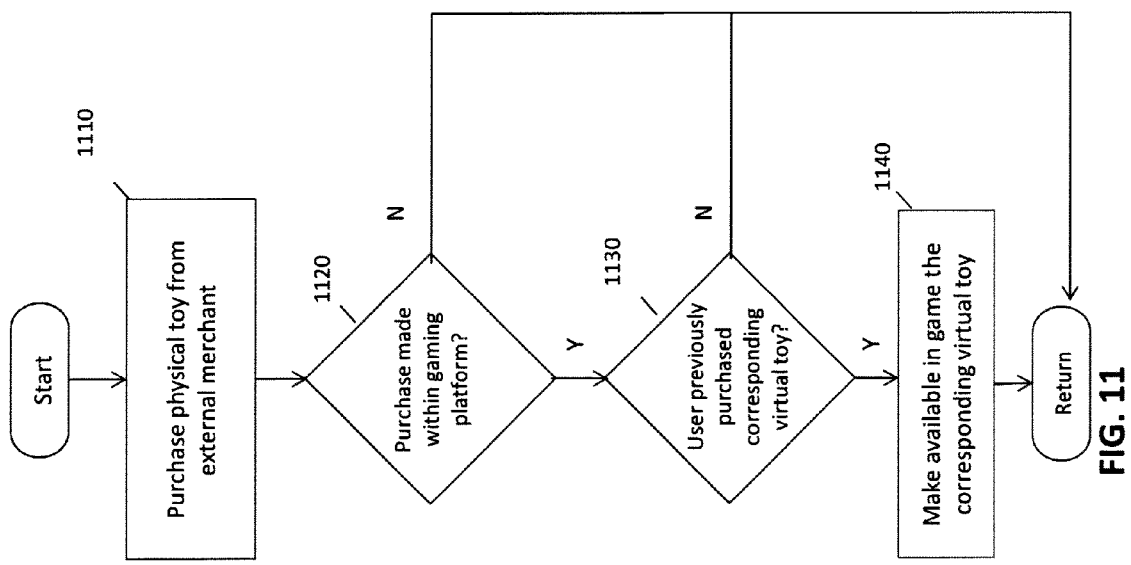
FIG. 11 is a flowchart of a process for making available a virtual toy in a video game in accordance with aspects of the invention

In accordance with aspects of the present invention, FIG. 11 is a flowchart of a process for making a virtual toy 131 available upon purchasing a physical toy 121. The process may be implemented by an external merchant, remote system, video game peripheral, a video gaming platform, or a combination of devices. Additionally, the process may be implemented using a processor configured by program instructions.

In block 1110, the process transacts a purchase of a physical toy 121 through an external merchant 123. As discussed, the external merchant 123 may conduct purchase transactions through any suitable store, including for example, a traditional brick and mortar store, an e-commerce site external to the gaming platform, an e-commerce site internal to the gaming platform, or a combination of the aforementioned.

In block 1120, the process determines whether the purchase was made within the gaming platform. If so, the process proceeds to block 1130. Otherwise the process returns.

In block 1130, the process determines whether the user previously purchased a virtual toy 131 corresponding to the purchased physical toy 121. The process does this, for example, by comparing the identification data of the physical toy 121 with identification data of virtual toys previously purchased by the user. If the user did not previously purchase a virtual toy 131 corresponding to the purchased physical toy 121, the process returns. If the user previously purchased a virtual toy 131 corresponding to the purchased physical toy 121, the process proceeds to block 1140.

In block 1140, the process makes available in the gaming platform the virtual toy 131 corresponding to the purchased physical toy 121.

Although the invention has been discussed with respect to various embodiments, it should be recognized that the invention comprises the novel and non-obvious claims supported by this disclosure.

What is claimed is:

1. A computer implemented method useful in conjunction with a video game having virtual game characters corresponding to physical toys, comprising:
    receiving a request to purchase utilizing a purchasing system within the video game, by a purchasing entity, use of a virtual game character for the video game;
    transmitting information of the virtual game character by the purchasing system to a first gaming platform, the information sufficient for use of the virtual game character in game play of the video game;
    providing, by a processor of the first gaming platform, for game play of the video game using the virtual game character, with the game play of the video game using the virtual game character resulting in updated information of the virtual game character reflecting a change in status of the virtual game character;
    receiving information by the purchasing system, indicating a purchase, by the purchasing entity, subsequent to receipt of the request to purchase use of the virtual game character and the transmission of information of the virtual game character to the first gaming platform and the provision for game play of the video game using the virtual game character, of a physical toy corresponding to the virtual game character, the received information including identification data stored on the physical toy and retrieved using radio frequency identification (RFID) interface circuitry of a peripheral device coupled to the first game platform;
    writing the updated information of the virtual game character by the peripheral device to a memory of the physical toy; and
    commanding by the purchasing system provision of a return value to the purchasing entity.

2. The method of claim 1, wherein the return value is a refund of a purchase price of the use of the virtual game character.

3. The method of claim 1, wherein the return value is in the form of points in the video game.

4. The method of claim 1, wherein the return value is in the form of in video game credits.

5. The method of claim 1, wherein the information indicating a purchase, by the purchasing entity, of the physical toy comprises registration information for the physical toy submitted with information of a user account.

6. The method of claim 5, wherein the information of the user account is a user name.

7. The method of claim 5 wherein the registration information includes a unique identifier assigned to the physical toy.

8. The method of claim 1, further comprising storing updated information of the virtual game character, thereby reflecting a change in status of the virtual game character due to game play of the video game.

9. The method of claim 8, further comprising transmitting the updated information of the virtual game character to a second gaming platform for the purpose of having the updated information written to memory of the physical toy.

10. The method of claim 9, wherein the first gaming platform is the second gaming platform.

11. A system for use in conjunction with a video game, comprising:
    at least one computing device, including at least one processor, configured to:
        transmit, over a network by a purchasing system within the video game, information of a virtual game character to allow for video game play including the virtual game character, in response to receipt by the purchasing system of an indication of a purchase of use of the virtual game character by a purchasing entity, without receipt of an indication of a purchase of a physical toy corresponding to the virtual game character, and
        subsequent to the transmission of information of the virtual game character by the purchasing system to allow for video game play including the virtual game character, transmit by the purchasing system, over the network, an information of value to the purchasing entity, in response to receipt of the indication of purchase of the physical toy by the purchasing system corresponding to the virtual game character by the purchasing entity; and
    a game platform coupled to a peripheral device including radio frequency identification (RFID) interface circuitry for communicating with the physical toy, the game platform configured for providing video game play including the virtual game character, transmit the indication of purchase of the physical toy corresponding to the virtual game character by the purchasing system to the peripheral device, and command writing of updated information of the virtual game character to the physical toy via the peripheral device;

wherein the indication of purchase of the physical toy by the purchasing system includes identification data stored in memory of the physical toy read by the peripheral device.

12. The system of claim 11, wherein the information of value is a request for provision of at least a partial refund of a purchase price of use of the virtual game character.

13. The system of claim 11, wherein the information of value is in the form of in-game credits for the video game.

14. The system of claim 11, wherein the at least one computing device includes associated memory, and the at least one processor is configured to store the updated information of the virtual game character in the memory.

15. The system of claim 11, wherein the updated information of the virtual game character reflects a change in status of the virtual game character due to game play.

16. The system of claim 15, wherein the at least one computing device is configured to transmit, over the network, information to allow the gaming platform to command writing of the updated information of the virtual game character to a memory of the physical toy.

17. The system of claim 11, wherein the gaming platform is configured to utilize the information of the virtual game character in providing game play in the absence of a presence of the physical toy about the peripheral device and to utilize information of the memory of the physical toy when the presence of the physical toy is detected by the peripheral device.

* * * * *

UNITED STATES PATENT AND TRADEMARK OFFICE
CERTIFICATE OF CORRECTION

PATENT NO. : 9,547,871 B2
APPLICATION NO. : 13/841964
DATED : January 17, 2017
INVENTOR(S) : Karthik Bala, Jennifer Oneal and Ben Throop It is certified that error appears in the above-identified patent and that said Letters Patent is hereby corrected as shown below:

In Column 16, Line 67, Claim 11, delete "transmit" and insert --transmitting--, therefor.

In Column 17, Line 3, Claim 11, delete "command" and insert --commanding--, therefor.

Signed and Sealed this
Tenth Day of April, 2018

Andrei Iancu
*Director of the United States Patent and Trademark Office*